(12) United States Patent
Bergholz et al.

(10) Patent No.: US 8,818,622 B2
(45) Date of Patent: Aug. 26, 2014

(54) VEHICLE SYSTEM COMPRISING AN ASSISTANCE FUNCTIONALITY

(75) Inventors: Ralf Bergholz, Braunschweig (DE); Michael Daginnus, Braunschweig (DE); Gabriel Schwab, Wolfsburg (DE); Yongmei Wu, Wolfsburg (DE); Christoph Wäller, Braunschweig (DE); Lennart Bendewald, Wolfsburg (DE); Thorsten Bohnenberger, Braunschweig (DE); Katja Lemke, Braunschweig (DE); Karl Rox, Wolfsburg (DE); Stefan Schulz, Berlin (DE); Jörg Lilienthal, Gifhorn (DE)

(73) Assignee: Volkswagen AG, Wolfsburg (DE)

( * ) Notice: Subject to any disclaimer, the term of this patent is extended or adjusted under 35 U.S.C. 154(b) by 852 days.

(21) Appl. No.: 12/677,561

(22) PCT Filed: Jun. 13, 2008

(86) PCT No.: PCT/EP2008/005043
§ 371 (c)(1),
(2), (4) Date: Jul. 12, 2010

(87) PCT Pub. No.: WO2009/036823
PCT Pub. Date: Mar. 26, 2009

(65) Prior Publication Data
US 2010/0286867 A1    Nov. 11, 2010

(30) Foreign Application Priority Data

Sep. 12, 2007   (DE) .................... 10 2007 043 935

(51) Int. Cl.
*G06F 17/00*     (2006.01)
*B60Q 1/00*      (2006.01)
*G06F 3/033*     (2013.01)

(52) U.S. Cl.
USPC .............................. 701/36; 340/438; 715/863

(58) Field of Classification Search
CPC ......... G06F 3/033; G06F 19/00; G06F 17/00; G06F 7/00; G06F 21/601; G06F 21/6227; G06Q 30/00; G06Q 10/00; G06Q 20/14; G06Q 30/06; G06Q 50/18; G01C 21/26; G01C 21/00; G01C 21/005; G01C 21/31; H04L 63/1418; H04L 63/02; H04L 63/10
USPC .......... 701/36, 33, 1, 29.1, 29; 345/173, 473, 345/2; 370/401; 340/438; 348/148; 715/716, 202, 863; 463/43
See application file for complete search history.

(56) References Cited

U.S. PATENT DOCUMENTS 6,009,355 A * 12/1999 Obradovich et al. ............. 701/1
6,344,793 B1    2/2002  Geck et al. ................. 340/425.5

(Continued)

FOREIGN PATENT DOCUMENTS

DE      19943348     3/2001  ............... G06F 3/00
DE      10006351     8/2001  ............. B60R 16/02

(Continued)

OTHER PUBLICATIONS

International Search Report and Written Opinion for Application No. PCT/EP2008/005043 (8 pages), Oct. 13, 2008.

(Continued)

*Primary Examiner* — Fadey Jabr
*Assistant Examiner* — Luis A Martinez Borrero
(74) *Attorney, Agent, or Firm* — King & Spalding L.L.P.

(57) ABSTRACT

The vehicle system, controlled by control inputs, provides functionalities in the motor vehicle (1) and has an interface (9) for acquiring the control inputs and outputting data as well as a control device (5) for controlling the functionalities in accordance with the acquired control inputs. A storage medium (7) on which instructions explaining the functionalities and/or operation are stored is linked to the control device (5). The control device (5) is designed to retrieve instructions from the storage medium (7) and output the same as part of the instructions via the interface (9). The vehicle system (3, 3') can be operated in an assistance mode in which the user inputs are interpreted and evaluated as control inputs for the functionalities while instructions explaining the respective activated functionality and/or other operational options are additionally output at the same time.

24 Claims, 6 Drawing Sheets

(56) References Cited

U.S. PATENT DOCUMENTS

| | | | |
|---|---|---|---|
| 6,373,472 B1* | 4/2002 | Palalau et al. | 345/173 |
| 6,457,975 B1* | 10/2002 | Miranda et al. | 434/236 |
| 6,956,470 B1* | 10/2005 | Heise et al. | 340/438 |
| 7,091,976 B1* | 8/2006 | Ostermann et al. | 345/473 |
| 7,289,020 B2* | 10/2007 | Larson et al. | 340/438 |
| 7,421,321 B2* | 9/2008 | Breed et al. | 701/33.6 |
| 7,969,290 B2* | 6/2011 | Waeller et al. | 340/438 |
| 8,009,025 B2* | 8/2011 | Engstrom et al. | 340/438 |
| 8,180,516 B2* | 5/2012 | Remboski et al. | 701/29.1 |
| 8,190,324 B2* | 5/2012 | Hattori et al. | 701/36 |
| 8,458,618 B2* | 6/2013 | Nezu et al. | 715/863 |
| 2001/0052912 A1* | 12/2001 | Ishii et al. | 345/835 |
| 2004/0054964 A1* | 3/2004 | Bozdagi et al. | 715/500.1 |
| 2005/0080528 A1* | 4/2005 | Obradovich | 701/36 |
| 2005/0102077 A1* | 5/2005 | McCullough et al. | 701/36 |
| 2005/0107925 A1 | 5/2005 | Enigk et al. | 701/1 |
| 2005/0135112 A1* | 6/2005 | Olkay et al. | 362/551 |
| 2005/0204287 A1* | 9/2005 | Wang | 715/716 |
| 2005/0234617 A1* | 10/2005 | Kynast et al. | 701/36 |
| 2005/0273213 A1* | 12/2005 | Little | 701/1 |
| 2006/0013237 A1* | 1/2006 | Furuta et al. | 370/401 |
| 2006/0097956 A1* | 5/2006 | Ogawa | 345/2.1 |
| 2006/0215414 A1* | 9/2006 | Lauber | 362/511 |
| 2006/0247836 A1* | 11/2006 | Mansell et al. | 701/36 |
| 2006/0287787 A1* | 12/2006 | Engstrom et al. | 701/36 |
| 2007/0005206 A1* | 1/2007 | Zhang et al. | 701/36 |
| 2007/0055423 A1* | 3/2007 | Yoshida et al. | 701/36 |
| 2007/0060388 A1* | 3/2007 | Stelzer et al. | 463/43 |
| 2007/0106439 A1* | 5/2007 | Lin et al. | 701/36 |
| 2007/0124046 A1* | 5/2007 | Ayoub et al. | 701/36 |
| 2008/0039998 A1* | 2/2008 | Fein et al. | 701/36 |
| 2008/0278298 A1* | 11/2008 | Waeller et al. | 340/425.5 |
| 2009/0058680 A1* | 3/2009 | Benn | 340/908.1 |
| 2009/0144622 A1* | 6/2009 | Evans et al. | 715/706 |
| 2009/0299569 A1* | 12/2009 | Knoll et al. | 701/36 |
| 2010/0045797 A1* | 2/2010 | Schofield et al. | 348/148 |
| 2010/0070932 A1* | 3/2010 | Hur | 715/863 |
| 2011/0260887 A1* | 10/2011 | Toledo et al. | 340/932.2 |

FOREIGN PATENT DOCUMENTS

| | | | |
|---|---|---|---|
| DE | 10117410 | 11/2002 | B60R 16/02 |
| DE | 10220797 | 12/2003 | B60R 16/02 |
| DE | 102005002277 A1 * | 10/2006 | G01C 21/36 |
| DE | 102006052898 A1 | 5/2007 | |
| EP | 0675018 | 10/1995 | B60K 35/00 |
| EP | 1031456 | 8/2000 | B60K 35/00 |
| EP | 1749688 | 2/2007 | B60K 35/00 |
| WO | 2007054284 | 5/2007 | B60K 37/00 |
| WO | WO 2007054284 A1 * | 5/2007 | G01C 21/36 |

OTHER PUBLICATIONS

Notification of Transmittal of the International Preliminary Report on Patentability for Application No. PCT/EP2008/005043 (6 pages), Apr. 7, 2010.

* cited by examiner

VEHICLE SYSTEM COMPRISING AN ASSISTANCE FUNCTIONALITY

CROSS-REFERENCE TO RELATED APPLICATIONS

This application is a U.S. National Stage Application of International Application No. PCT/EP2008/005043 filed Jun. 13, 2008, which designates the United States of America, and claims priority to German Application No. 10 2007 043 935.2 filed Sep. 12, 2007, the contents of which are hereby incorporated by reference in their entirety.

TECHNICAL FIELD

The invention relates to a vehicle system of a motor vehicle which provides functionalities in the motor vehicle and a method for operating a vehicle system of a motor vehicle.

BACKGROUND

Vehicle systems in modern motor vehicles provide a plurality of functionalities and functions. Accordingly, the vehicle systems as well as their operation have become more complex. Vehicle navigation systems, infotainment systems and/or multi-function systems which for example include a vehicle navigation system and an infotainment system generally are not operable for a user without explanatory information. According to prior art the necessary explanation information is contained in printed operating manuals which are added to a motor vehicle. However, the willingness of users to read these operating manuals is marginal. Furthermore, operating activities requiring a plurality of different operating steps only can be illustrated in a printed operating manual with difficulty.

Newer considerations have led to save an operating manual in electronic form. For example, described in DE 100 06 351 A1 is a device for retrieving information related to the function and operation of different equipments of a motor vehicle, wherein the motor vehicle is provided with at least one vehicle bus to which different components of the vehicle electronics are connected. The device comprises an information basis in which information related to the function and operation of different equipments of the motor vehicle are stored, a microcomputer connected to the information basis, input means for retrieving information from the information basis and output means for displaying the retrieved information. For the device described it is implemented that the microcomputer is connected to the vehicle bus and is programmed such that the information needs of the user are detected by means of evaluating the data supplied to the vehicle bus by the individual components of the vehicle electronics and corresponding information is automatically retrieved from the information basis and reproduced. For example, in error situations indications for a possible malfunction repair are given. Using the system the user is able to retrieve the electronically stored explanation information in the motor vehicle and in some error situations receives indications how to eliminate the error situation. However, a learning of the operation is not supported in an optimal manner.

SUMMARY

According to various embodiments, a vehicle system can be established that better supports the learning of an operation and/or a performing of an operation for a person who does not know or does not completely know the vehicle system.

According to an embodiment, a vehicle system of a motor vehicle, which provides functionalities in the motor vehicle controlled by means of control inputs, may comprise an interface for detecting the control inputs and outputting information and a control device for controlling the functionalities depending on the detected control inputs, wherein coupled to the control device is a storage medium on which explanation information is stored which explains the functionalities and/or the operation, wherein die control device is designed to retrieve from the storage medium and to output the explanation information as a part of the information via the interface, wherein the vehicle system is operable in an assistance mode in which the user inputs are considered and evaluated as control inputs for the functionalities and in addition explanation information is output simultaneously which explains the respective activated functionality and/or further operation possibilities.

According to a further embodiment, the vehicle system may be operable in an instruction mode in which by means of detected control inputs a desired functionality is selectable which the user wants to trigger and/or to operate, and after the selection of the desired functionality a change-over into the assistance mode occurs automatically, wherein only explanation information is output by the control device which instructs the user to trigger and/or to operate the desired functionality and/or explains the desired functionality. According to a further embodiment, the control device may comprise a comparison module by means of which the control inputs in an assistance mode triggered by the instruction mode are compared to the intended control inputs for triggering and/or operating the desired functionality, and in case of a deviation and/or correlation a feedback is output to the user. According to a further embodiment, the vehicle system may be operable in an operating mode in which control inputs are only considered and evaluated as control inputs for operating the provided functionalities and no additional explanation information is output. According to a further embodiment, the vehicle system may be operable in an explanation mode in which the control inputs are only considered and evaluated as control inputs for retrieving explanation information. According to a further embodiment, the vehicle system may comprise a configuration unit by means of which one of the operating modes may be determined into which the vehicle system changes over following a start-up. According to a further embodiment, at a first-time change-over into the instruction mode following a start-up and/or the assistance mode and/or the explanation mode automatically explanation information may be output which explains the outputting of explanation information and its control by means of the control inputs. According to a further embodiment, the interface may comprise operating elements for detecting the control inputs or is coupled to those. According to a further embodiment, the interface may comprise at least one output device or is coupled thereto. According to a further embodiment, the interface may be coupled to a multi-function display and operating device. According to a further embodiment, the vehicle system may be integrated into a multi-function display and operating device. According to a further embodiment, the multi-function display and operating device may comprise a display device comprising a programmable display surface. According to a further embodiment, the at least one output device may comprise an audio system. According to a further embodiment, the outputting of the explanation information in the assistance mode may only be carried out by means of an audio system. According to a further embodiment, the interface and/or the further interface may comprise several differently modal output devices or is coupled to differently modal output devices so that the explanation information may be output multimodal, for example optically and acoustically. According to a further embodiment, the explanation information can be designed to display an artificial animated person during the output of the explanation information.

According to another embodiment, a method for operating a vehicle system of a motor vehicle may comprise the steps of detecting or receiving control inputs, evaluating the control inputs and controlling and providing the functionalities of the vehicle system according to the control inputs, wherein the vehicle system is operable in an assistance mode in which the control inputs in addition simultaneously are evaluated for a provision of explanation information which explains the functionalities and/or a further operation of the vehicle system and according to the evaluation explanation information related to the provided functionalities and/or further operating possibilities are retrieved from a storage medium and output to the user or several users.

According to a further embodiment of the method, the vehicle system may be operable in an instruction mode in which by means of detected control inputs a desired functionality is selected which the user wants to trigger and/or to operate, and following the selection of the desired functionality a change-over into the assistance mode occurs automatically, wherein, by means of the control device, only explanation information is output which instructs the user to trigger and/or to operate the desired functionality and/or to explain this desired functionality. According to a further embodiment of the method, in the assistance mode triggered by the instruction mode the control inputs can be compared to intended control inputs for triggering and/or operating the desired functionality, and in the case of a deviation and/or a correlation a feedback is output to the user. According to a further embodiment of the method, the vehicle system may be operable in an operating mode in which user inputs are only considered and evaluated as control inputs and no additional explanation information is output. According to a further embodiment of the method, the vehicle system may be operable in an explanation mode in which the user inputs are only considered and evaluated as control inputs for retrieving explanation information. According to a further embodiment of the method, at a first-time change-over into the instruction mode following a start-up and/or the assistance mode and/or the explanation mode explanation information can be output automatically which explains the outputting of explanation information and its control by means of the control inputs. According to a further embodiment of the method, control inputs can be detected by means of which one of the operating modes is determined into which the vehicle system changes over following a start-up. According to a further embodiment of the method, the explanation information can be output using an animated artificial person.

BRIEF DESCRIPTION OF THE DRAWINGS

In the following the invention is described in more detail with respect to exemplary embodiments and with respect to a drawing. Hereby shows.

DETAILED DESCRIPTION

According to various embodiments, a control device of the vehicle system is linked to a storage device which preferably is integrated into the vehicle system and in which the explanation information describing the functionalities of the vehicle system and its operation is stored. Further, the control device is linked to an interface by means of which the control inputs of the user are detected and information may be output. The vehicle system is operable in an assistance mode in which the control inputs by means of which the functionalities of the vehicle system are controlled are (additionally) evaluated by the control device to retrieve from the storage medium and to reproduce by means of the interface explanation information which explains the respective activated functionality and/or further actual operating possibilities. Hereby, during the operation of the vehicle system by means of control inputs it becomes feasible for the user to receive in each case output corresponding to the explanation information related to the currently activated functionality and/or to receive the required operating manuals which explain the further feasible operating steps to the user. In particular it is proposed a vehicle system of a motor vehicle which controlled by control inputs provides functionalities in the motor vehicle, which comprises an interface for detecting the control inputs and for outputting information and a control device for controlling the functionalities depending on the control inputs detected. In this vehicle system the control device is linked to a storage medium on which explanation information is stored which explains the functionalities and/or the operation, wherein the control device is designed to retrieve explanation information from the storage medium and to output it by means of the interface as a part of the information, wherein the vehicle system is operable in an assistance mode in which the user inputs are considered and evaluated as control inputs for the functionality, and in addition and at the same time explanation information is released which explains the respective activated functionality and/or further operating possibilities. Thus, a user is put in a position to immediately complete the explanations made accessible to her/him by means of the explanation information and such in particular to complete multi-stage operating activities assisted by the explanation information of the vehicle system while the individual operating steps are explained to her/him by means of the explanation information.

In an embodiment it is provided for that the vehicle system is operable in an instruction mode in which a desired functionality which the user wants to retrieve and/or to operate is selectable by means of detected control inputs, and in which after selecting the desired functionality an automatic switch into the assistance mode is carried out, wherein the control device only outputs explanation information which instructs the user to activate and/or operate the desired functionality and/or describes the desired functionality. In this embodiment the user at first selects a functionality which she/he wants to operate. Subsequently, the vehicle system changes over into the assistance mode, wherein, however, now only the explanation information is output which instructs the user to activate and/or to operate the desired functionality. Thus, explanation information which would relate to other feasible options during a multi-stage operating activity is not released. This embodiment allows the user to activate and/or operate a function in a purposefully assisted manner. Even users who are able to operate a plurality of functions of a vehicle system often are not in the position to operate all functions without errors. Thus, also these users, by means of the instruction mode and the automatic change-over into the assistance mode, may operate and learn in an assisted manner rarely used functions whose operation they are not familiar with.

It has emerged to be advantageous for the learning success if the user as a result of an operating activity carried out which is detected as a control input receives a feedback if she/he has or has not carried out the intended operating activity correctly. At least in the case of operating activities not carried out correctly a feedback is required in order to allow for a correction by the user. Therefore, an embodiment allows for that the control device includes a comparison module by means of which the control inputs are compared to the intended control inputs for triggering and/or operating the desired functionality in an assistance mode activated by the instruction mode, and at a deviation and/or correlation a feedback is output to the user.

The vehicle system is designed such that in the assistance mode, also when this was triggered by the instruction mode, all user inputs are detected and evaluated as control inputs as this would be the case in a pure operating mode in which the user inputs merely are detected as control inputs. Hereby it is achieved that the user may quickly react to altered situations or may decide differently during a multi-stage operation for triggering a functionality and may activate another functionality without a further input being required to do so. In a further embodiment it may be provided for that control inputs deviating from the intended control inputs when the vehicle system is operated in the assistance mode which was invoked from the instruction mode are not regarded as control inputs for the vehicle system for triggering functionalities. In such an embodiment it is only feasible to trigger and/or to operate the desired functionality in the assistance mode that was invoked from the selection mode. Undesirable operating errors carried out by mistake thus do not activate functions of the vehicle system.

In order to allow for an operation by a skilled user in which during the operation of the vehicle system no explanation information is output it is intended in an embodiment that the vehicle system is operable in an operating mode in which control inputs are only considered and evaluated as control inputs for the vehicle system and no additional explanation information is output.

In other situations it is desired to receive information about the functionalities of the vehicle system without at the same time to operate the vehicle system with respect to the functionalities provided. Thus it is preferred that the vehicle system is operable in an explanation mode in which the control inputs only are considered and evaluated as control inputs for retrieving explanation information.

In embodiments in which the vehicle system is operable in different operating modes it is advantageous if the user may select into which operating mode the vehicle system is to change over at a start-up. The vehicle system therefore may comprise a configuration unit by means of which one of the operating modes is defined into which the vehicle system is changing over following a start-up.

In an embodiment it is provided for that at a first-time change-over following the start-up into the instruction mode and/or the assistance mode and/or the explanation mode explanation information is automatically output which explains the outputting of explanation information and its control by means of the control inputs. This is to say that the different operating modes in which it is intended that explanation information is output are explained at least at a first-time change-over into this operating mode following a start-up of the vehicle system. Thus it is ensured that the inexperienced user in each case receives the required information about how the operating modes are to be used in which explanation information are offered to the user.

The vehicle system is preferably designed such that the interface comprises operating elements for detecting the control inputs or is coupled to these. It is also advantageous when the interface comprises at least one output device or is coupled thereto.

In an embodiment the interface is coupled to a multi-function display and operating device or is designed as such. Proven to be particularly beneficial has an embodiment in which the vehicle system is integrated into a multi-function display and operating device. By means of this a detection of the control instructions as well as an output of the explanation information is feasible in a simple manner. A particularly easy to register output of the explanation information becomes feasible if the multi-function display and operating device comprises a display device comprising a programmable display surface. Thereby it is allowed for to display a plurality of graphic representations at the same position of the display surface at different points in time. Using a programmable display surface it is also allowed for to output the explanation information in an animated manner and/or in the form of movie sequences.

A use of a display and operating device formed as a touch-screen has proven to be particularly advantageous for outputting information and detecting control inputs. The explanation information may affect a display of the virtual operating elements. For example, the operating elements may be highlighted graphically while the functionalities which may be activated by means of their use are explained. A supportive instruction for triggering a functionality thereby may be carried out particularly effective.

It has proven to be particularly beneficial when at least one output device comprises an audio system. Through this it is feasible to output audio information. Particularly in vehicle systems comprising a touchscreen as an interface and an integrated operating element, respectively, and an output device for detecting control instructions of the user and outputting information to the user it is advantageous when in addition an output device is existent which is designed as an audio system. With such systems it is often difficult to output the explanation information on the display surface of the touchscreen and at the same time to display the virtual operating elements and/or the information which the vehicle system displays in the course of the provision of its functionalities and/or which are required for operating the vehicle system. In an embodiment it is thus intended that the outputting of explanation information in the assistance mode is carried out by means of an audio system only. In other embodiments and/or in other operating modes it is advantageous when the interface comprises several differently modal output devices or is coupled to differently modal output devices so that the explanation information may be output multi-modal, for example optically and acoustically.

It has proven to be particularly intuitive for the user to design the explanation information such as to display an artificially animated person (avatar) during the output of the explanation information. Such a person may support the explanation information particularly beneficial since human users are particularly good accustomed to gestures of humans which are used during explanation activities of natural persons. The artificial person may also use these gestures and thereby may support an explanation particularly simple and intuitively. Even in vehicle systems comprising a touchscreen the avatar may for example be employed as a transparent figure and may such support an output of the explanation information, in particular an output of multi-modally released explanation information.

The characteristics of the method according to various embodiments have the same advantages as the respective characteristics of the device according to various embodiments.

Figure 1:
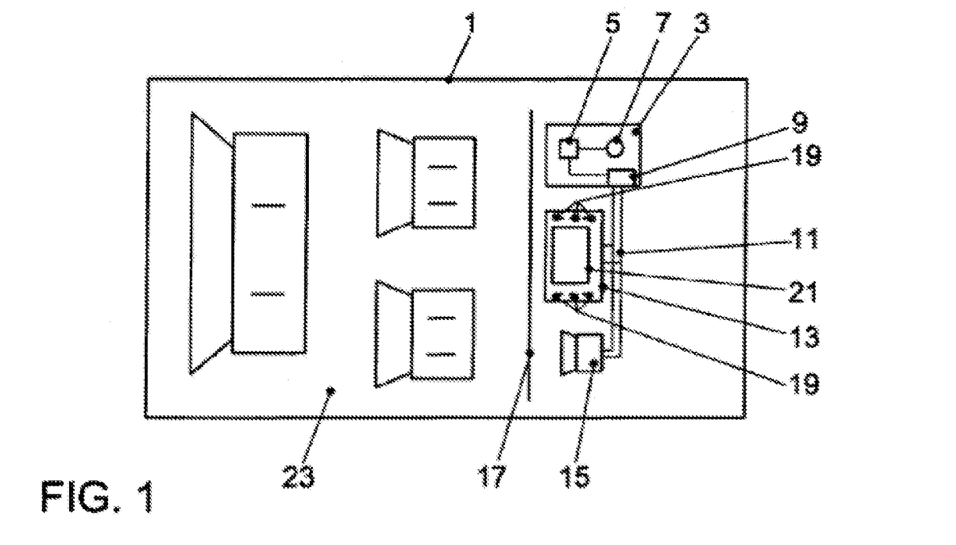
FIG. 1 a schematic view of a motor vehicle comprising an embodiment of a vehicle system by means of which an operation is learnable during its execution.

Schematically illustrated in FIG. 1 is a motor vehicle 1. It comprises at least one vehicle system 3. The vehicle system 3 provides one or several functionalities for the motor vehicle 1, for example vehicle navigation functionalities. The vehicle navigation functionalities may for example comprise a target guided navigation of the motor vehicle in which driving direction indications are output to the driver. If the driver follows these driving direction indications she/he will be guided towards a predetermined target with the motor vehicle. The vehicle system may of course provide other and/or further functionalities.

The vehicle system 3 comprises a control device 5 which controls the individual functionalities of the vehicle system 3. Coupled to the control device 5 is a storage medium 7 in which explanation information is stored. The explanation information comprises information for explaining the functionalities of the vehicle system and/or its operation. The explanation information may comprise audio data and/or video data, data for graphic illustrations, for animated graphics, for text and so forth. The vehicle system 3 further comprises an interface 9 through which the vehicle system is connected to a multi-function display and operating device 13 and an audio system 15, for example via a vehicle data bus 11. It is essential that besides providing the explanation information the control device also controls the functionality of the vehicle system.

In other embodiments the interface 9 may be designed such that it comprises operating elements for detecting control inputs of the user and/or at least one output device, for example a display device, an audio replay system, a speech recognition unit and so forth.

The multi-function display and operating device 13 preferably is integrated into a console 17 or a dashboard of the motor vehicle 1. In order to detect control inputs of the user the multi-function display and operating device 13 comprises operating elements 19. For outputting information the multi-function display and operating device 13 preferably comprises a display device 21 which is a programmable display surface, for example a LCD display, which may be formed in color, a plasma display or the like. In other embodiments the display device may also be a projection display device by which a graphic illustration is projected onto a display surface.

A user (not shown) located in a passenger compartment 23 of the motor vehicle 1 may operate the operating elements 19 and thereby may carry out control inputs for the vehicle system 3. This thereupon provides its functionalities. If the vehicle system 3 for example is a vehicle navigation system, then, for example, it displays a section of a map which depicts the surroundings of the current motor vehicle position as well as, if indicated, driving direction indication information, for example in the form of arrows displayed in the section of the map which support a targeted navigation of the motor vehicle 1 in its surroundings.

In an embodiment the multi-function display and operating device 13 is provided with a display device 21 formed as a touchscreen which besides outputting information may detect a contact and a contact position of an actuation element, for example of a finger of the user. By means of logics of the display device formed as a touchscreen a control instruction may be assigned to the contact position dependent on the information displayed on the display surface. In an assistance mode control inputs cause that the explanation information stored in the storage medium 7 in the vehicle system 3 which explains the functionality descriptions triggered by the control input and/or further operating options are output to the user.

In case the motor vehicle comprises several vehicle systems (not shown), then these may jointly use the multi-function display and operating device.

Figure 2:
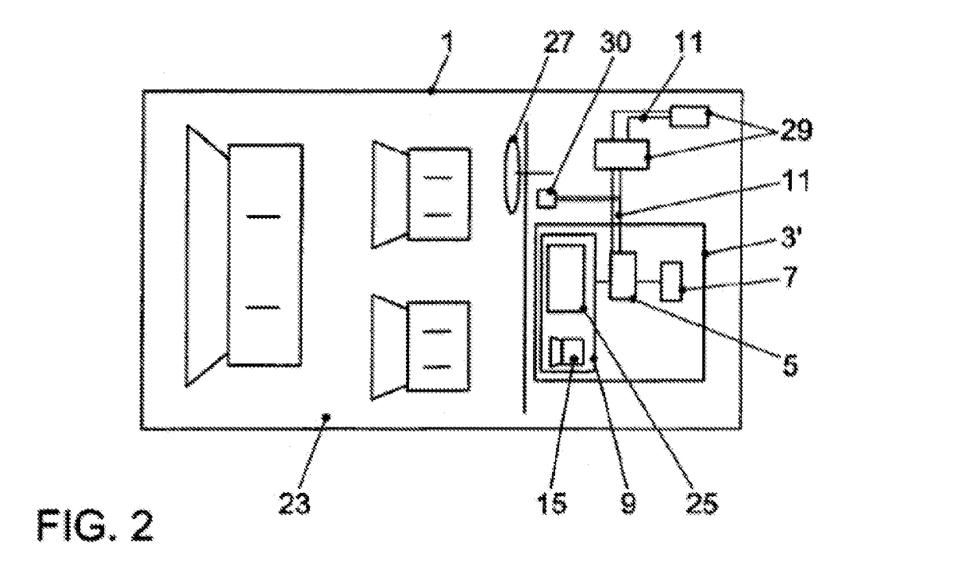
FIG. 2 a schematic illustration of a further motor vehicle comprising a further embodiment of a vehicle system by means of which an operation is learnable during its execution.

FIG. 2 schematically also shows a motor vehicle 1. Like technical characteristics are indicated by like reference numerals in all Figures. Motor vehicle 1 comprises a vehicle system 3' which provides different functionalities. The vehicle system 3' comprises a control device 5 as well as storage medium 7 which may for example be formed as a hard disk, a flash memory, a memory card or a DVD and so forth. An interface 9 for detecting control inputs and outputting information in this embodiment comprises a display and operating device 25 formed as a touchscreen as well as an audio system 15. In other embodiments the interface may further comprise input and/or output means, for example a speech recognition unit and/or operating elements which are integrated into the vehicle steering wheel 27, as well as haptic output means, which for example cause a vibration of elements arranged at the vehicle steering wheel 27. The control unit 5 evaluates control inputs detected by means of the interface 9 and generates control instructions to provide corresponding functionalities of the vehicle system 3. If the vehicle system 3 for example is formed as a vehicle navigation and infotainment system, then by means of the control device 5 for example an output of audio signals via the audio system 15 of the interface 9 is triggered as a reaction to actuation activities of the user. The vehicle system 5 is formed such that it may be changed over into an assistance mode by means of control inputs (for example user inputs). In this assistance mode the control inputs are evaluated such that explanation information is retrieved from the storage medium 7 and is output via the interface 9, for example display and operating device 25 formed as a touchscreen and/or the audio system 15, wherein the explanation information explains functionality triggered by the control input or further operating options. The actuation activities carried out, which are detected as control inputs, thus are evaluated and interpreted as control inputs for providing the functionalities of the vehicle system 3' as well as in addition are evaluated to that effect that from the storage medium 7 explanation information is retrieved and output which describes and explains the functionality activated accordingly and/or further operating options and possibilities. In order to provide the functionalities it may be required to exchange information with the further vehicle systems 29 via a vehicle data bus 11. The vehicle system 3' may serve as a user interface for these further vehicle systems 29. In addition, through the vehicle data bus 11 the vehicle system 3' may be coupled to a user identification device 30 which provides information about which of the users conducts an actuation activity of the display and operating device 25. Different embodiments of such user identification devices 30 are known to a person skilled in the art. These may for example capacitively receive different high frequency signals capacitively transferred via the driver and co-driver and may interpret these with respect to the different signals and such identify the driver and the co-driver. The high frequency signals transmitted via the driver and co-driver preferably are capacitively coupled into the driver and/or co-driver by means of high frequency sending units arranged at or in the vehicle seats. Other systems for identifying users utilize other technologies which for example interpret the paths of the agitated actuation elements, in particular of the hands of the users and assign these to the individual users.

Figure 3:
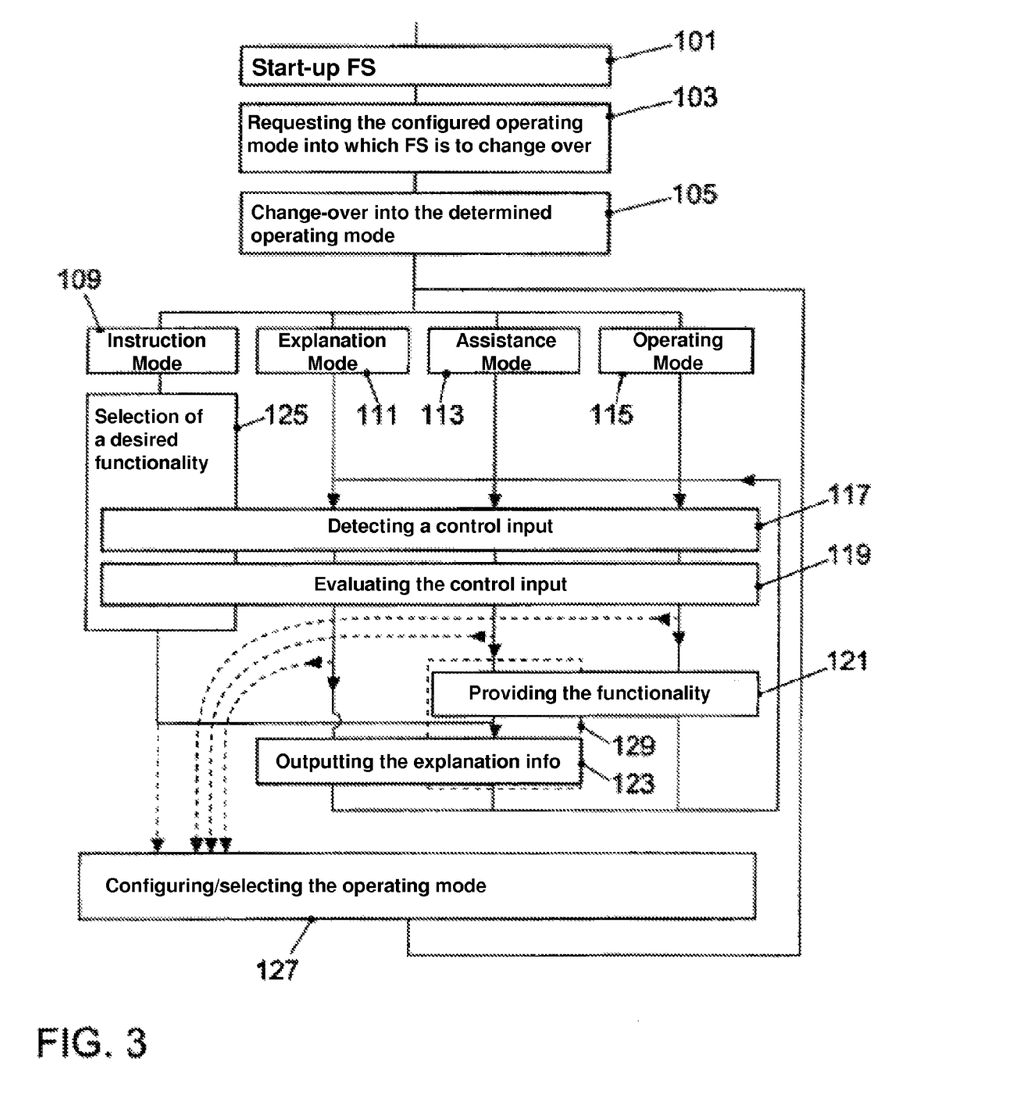
FIG. 3 a schematic view of a flow chart of a method for operating a vehicle system for learning the operation during the utilization of the vehicle system.

Schematically depicted in FIG. 3 is a flow chart of a method for operating a vehicle system of a motor vehicle. At first, the vehicle system (FS) is activated 101. Subsequently, the operating mode is determined into which the vehicle system is to change over 103. Subsequently the change-over into the determined operating mode is carried out 105. In the embodiment illustrated the vehicle system is operable in an instruction mode 109, in an explanation mode 111, in an assistance mode 113 and in an operating mode 115. The illustration in FIG. 3 is chosen such that one column is assigned to each operating mode. Method steps extending across several columns occur in those operating modes across whose columns they extend.

If, for example, the vehicle system is operated in the operating mode 115, then at first a control input is detected 117 and subsequently the control input is evaluated 119.

According to the evaluation the corresponding functionality of the vehicle system is provided 121. Subsequently, the method continues by detecting a further control input 117.

If, however, the vehicle system is operated in the assistance mode 113, then, as a result of the evaluation of the control input 119, in addition to providing the functionality 121 an explanation information is retrieved from the storage medium and output 123 which describes the activated functionality and/or further operating options and/or feasibilities. The concurrency of providing the functionality 121 and of outputting the explanation information is indicated by a dashed box 129. Subsequently, also in the assistance mode, a further control input is detected 117.

If the vehicle system is operated in explanation mode 111, then providing the functionality is omitted. In this mode the control inputs are only evaluated to output explanation information 123.

If the vehicle system is operated in instruction mode 109, then at first a desired functionality is selected which the user wants to operate in an assisted manner 125. Once the desired functionality is selected, the vehicle system changes over from the instruction mode 109 into the assistance mode 113, wherein at first explanation information is retrieved and output 123, and in each case in the assistance mode only the explanation information is output which outputs the respective currently activated functionality and/or the operating options which have to be completed in order to operate the desired functionality. Here it may be intended that additional (for example acoustic) feedback is output for the user. Detecting the control inputs 117 and evaluating the control inputs 119 may of course also cause that another operating mode is selected or the vehicle system is configured to that effect into which operating mode the vehicle system is to change after the start-up 127.

Figure 4:
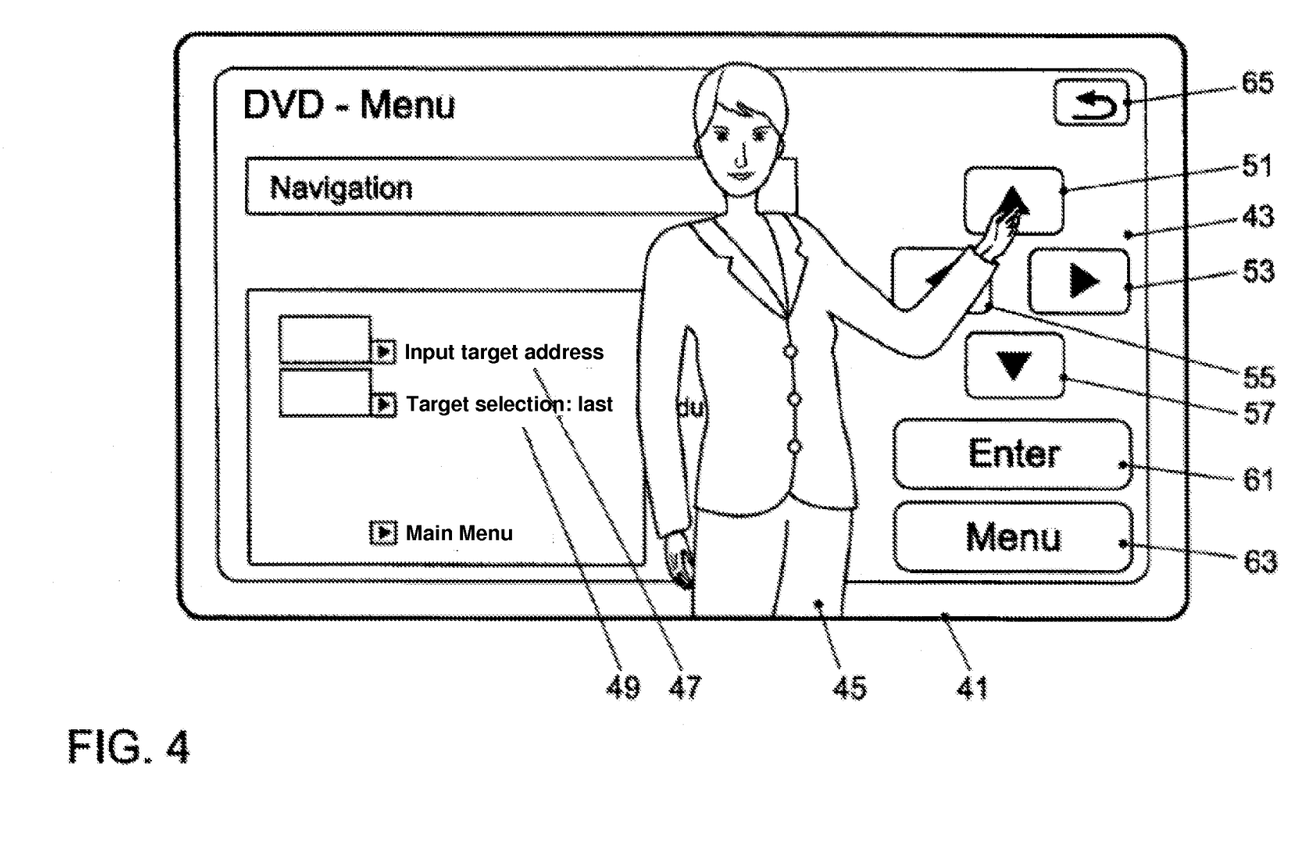
FIG. 4 a view of a display surface formed as a touchscreen on which an operating menu of a vehicle navigation functionality is displayed, the operation of which is supported by an artificial person.

Depicted in FIG. 4 is a view 41 of a display surface 43 formed as a touchscreen. The view 41 shows an illustration in which the vehicle system is operated in the assistance mode. An artificial person 45, which is also called an avatar, explains operation possibilities which are provided to a user in order to select one of the sub-menus 47, 49 in the operating menu of a vehicle navigation system displayed on the display surface 43. In order to select these, virtual operating elements 51 to 65 are displayed on the display surface 43. By means of touching the virtual operating elements 51 to 65 a control input may be carried out by the user. The artificial person 45 explains the implications that result from an actuation of the individual virtual operating elements 51 to 65. Thus, the artificial person 45, as an animated graphic, is overlaid over a view of the display surface 43 which results from the operating mode in which no explanation information is output. By means of gestures and for example a graphical highlighting of an individual and/or several of the virtual operating elements 51 to 65 as well as a simultaneous outputting of acoustic explanation information the individual operating options are explained. In view 41 the artificial person 45 explains the implications caused by an actuation of the operating element 51 which is highlighted graphically and to which the artificial person 45 is pointing using a gesture.

A view identical to the one of FIG. 4 also results in the assistance mode which is automatically triggered by the instruction mode. In this case the artificial person 45 merely will point out the operating element, for example the operating element 51, which is to be actuated to trigger and/or to operate the selected desired functionality.

Figure 5:
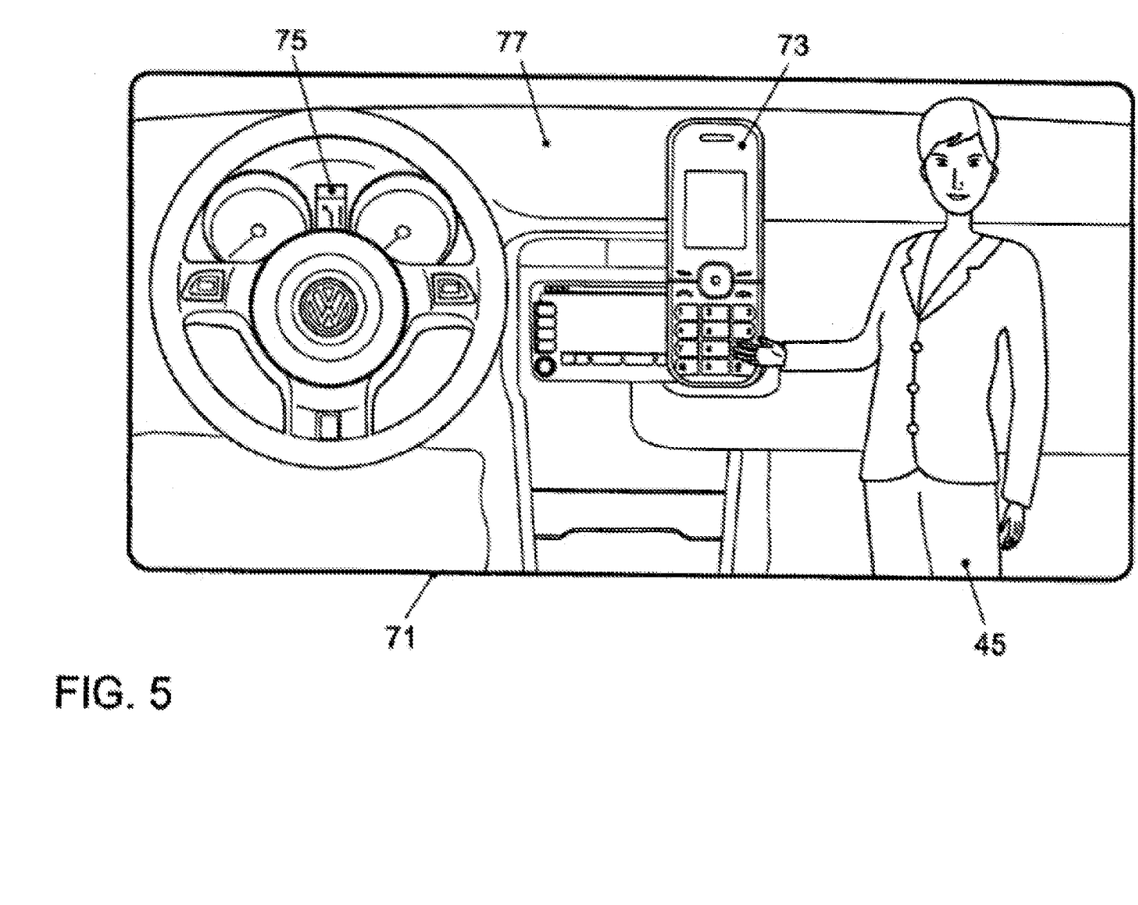
FIG. 5 a schematic view of a display surface on which explanation information is output which supports the operation of a functionality of the vehicle system.

Depicted in FIG. 5 is a further view 71 of a display surface of a display device on which explanation information is output which explains an operation of a vehicle system to a user. Illustrated is a situation in which the artificial person 45 explains how a cell phone 73 may be coupled to a vehicle system of a motor vehicle. A first time coupling of the cell phone 73 comprising a Bluetooth interface to the vehicle system requires a one-time completion of certain operating steps. The artificial person 45 at first points to a display surface 75 in the cockpit 77 and subsequently to the cell phone 73 while the following explanation is simultaneously output by means of an audio system: "Here is how you may couple your cell phone to the vehicle system. Please switch on the ignition and thereafter switch on the cell phone". Subsequently, during the coupling process the activities carried out by the user and the control inputs caused thereby are evaluated and in each case the according explanation information is output in a manner assisted by the artificial person 45 in order to explain to the user the individual steps during the coupling process. Also here, feedback messages may be output to the user indicating if the activities conducted have been carried out correctly or require a correction in order to correctly couple the cell phone 73 to the vehicle system.

In other embodiments it may be provided for that the explanation information in the assistance mode, in particular when it is triggered by the instruction mode, is merely output acoustically. This is particularly advantageous when the vehicle system is operated by means of a display and operating device formed as a touchscreen and a plurality of information and/or virtual operating elements is displayed on the display surface so that additional explanation information cannot be displayed.

It has turned out that a user may particularly easy realize the information output by the explanation information when he feels the artificial person, output together with the explanation information, to be likeable. Therefore it is intended in some embodiments that a form of the artificial person may be chosen individually by each user. The explanation information then is formed such that the precise embodiment of the graphically displayed information and/or the acoustically output information is carried out depending on this definition. For example, male users may prefer an explanation by a male artificial person and women may prefer an explanation by a female artificial person.

In particular when a speech recognition system is used for detecting control inputs it is advantageous when the artificial person has a inartificial name. Also here it is again an advantage for the acceptance of the system if the user may define the name of the person her-/himself. An activation of the explanation information then may be effected by calling the name, this is to say by a vocalization of the name, together with a requesting sentence for triggering an output of the explanation functions. For example, the output of explanation information may be activated by a user by vocalizing the following sentence: "Klaus, please help me", if the user has assigned the name Klaus to the artificial person. It unfolds that almost any name may be assigned to the artificial person by the user.

Figure 6:
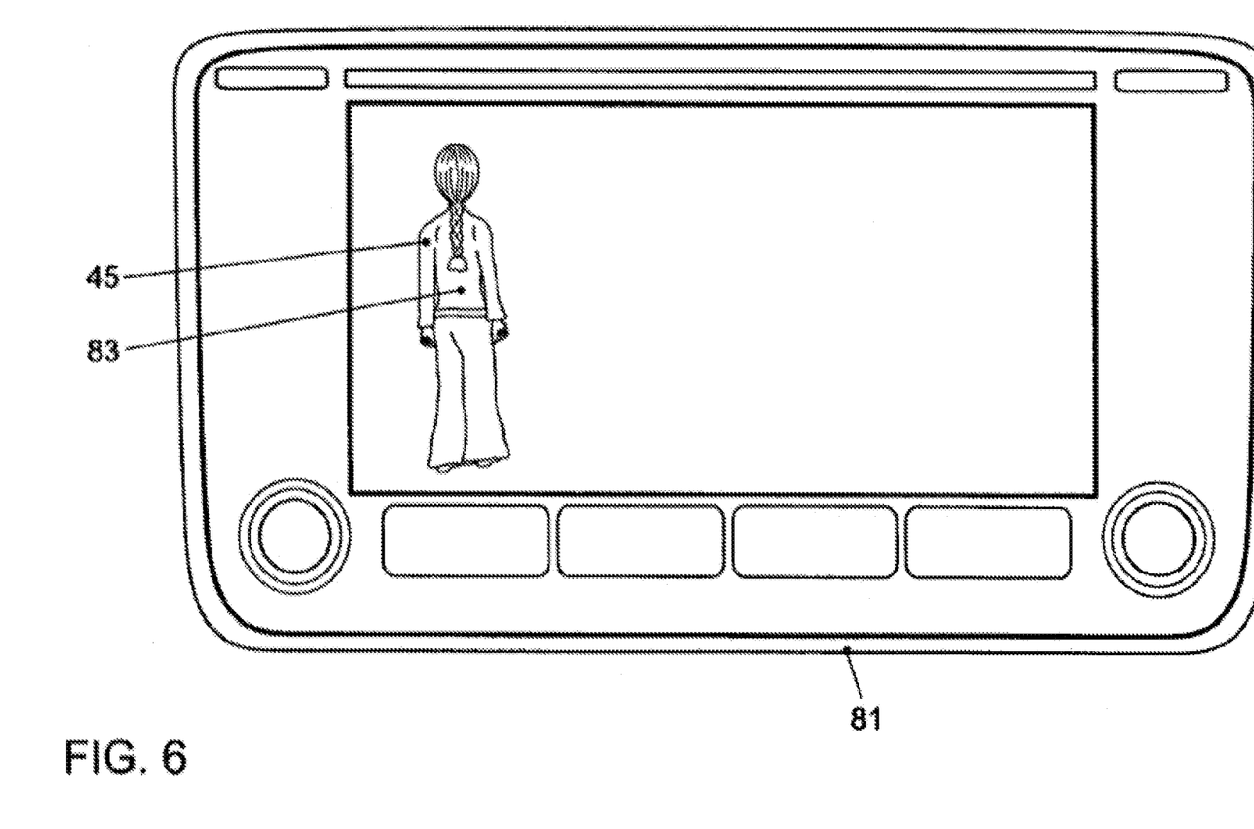
FIG. 6 a schematic illustration of a vehicle system formed as a multi-function display and operating device in which an artificial person indicates an inactive state of a mode providing explanation information by means of turning a back towards the user.
Figure 7:
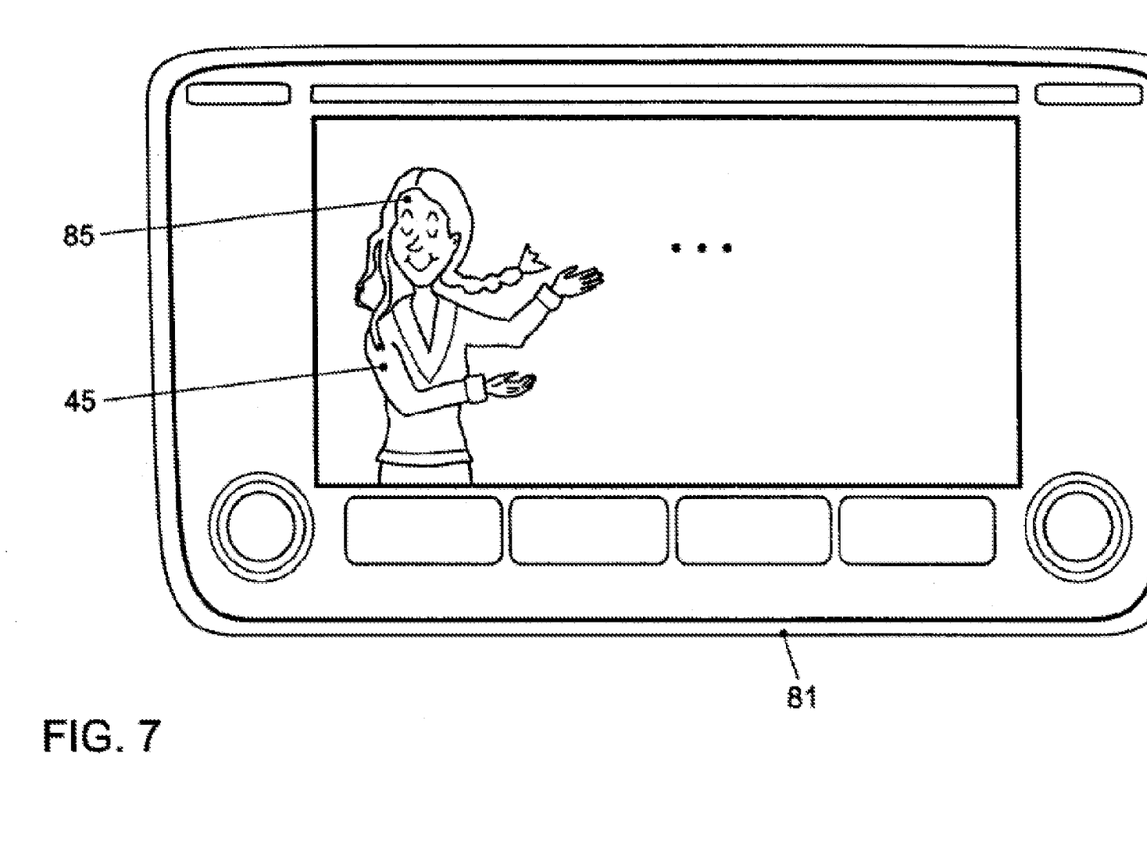
FIG. 7 a view of a vehicle system according to FIG. 6 in which the artificial person is active in order to explain a functionality of the vehicle system in a supporting manner.

In order to indicate to the user if the artificial person is active or inactive it is intended in some embodiments that the artificial person is displayed on the display surface in a position turned away from the user when the artificial person is inactive. For example, this is depicted schematically in FIG. 6 in which the view of a multi-function display and operating device 81 is illustrated schematically. The artificial person 45 has turned its back 83 towards the user. However, if the artificial person 45 is active it turns its face 85 towards the user. This is depicted in FIG. 7 as an example. It unfolds to a person skilled in the art that an inactivity of the artificial person and thus an inactivity of an output and/or a control of explanation information may also be indicated thus that the artificial person is depicted highly reduced and/or laterally turned away. By means of an enhanced and/or facing illustration, however, it is signalized to the user that an output and/or a control of explanation information is active.

The embodiments illustrated are merely carried out by way of example and are not to be construed as limiting. The individual characteristics of the individual embodiments described may be combined in any manner in order to exert the invention.

REFERENCE NUMERALS 1 motor vehicle
3 motor vehicle system
5 control device
7 storage medium
9 interface
11 vehicle data bus
13 multi-function display and operating device
15 audio system
17 console
19 operating element
21 display device
23 passenger compartment
25 display and operating device
27 vehicle steering wheel
29 further vehicle systems
30 user identification unit
41 view of a display surface
43 display surface
45 artificial person
47-49 sub-menus
51-65 virtual operating elements
71 view of a display and operating device
73 cell phone
75 display surface
77 cockpit
81 view of a multi-function display and operating device
83 back
85 face
101 start-up of vehicle system
103 requesting the configured operating mode into which the vehicle system is to change over
105 change-over into the determined operating mode
109 instruction mode
111 explanation mode
113 assistance mode
115 operating mode
117 detecting a control input
119 evaluating the control input
121 providing the functionality
123 outputting the explanation information
125 selecting a desired functionality
127 configuration/selection of the operating mode
129 box

What is claimed is:

1. A vehicle system of a motor vehicle, which provides functionalities in the motor vehicle controlled by means of control inputs, comprising:
an interface for detecting the control inputs and outputting information,
a control device for controlling the functionalities depending on the detected control inputs, and
a storage medium coupled to the control device, the storage medium storing explanation information that explains the functionalities and/or operator controls,
wherein the control device is configured to retrieve the explanation information from the storage medium and to output the explanation information as a part of the information via the interface,
wherein the vehicle system is switchable between: an assistance mode of the vehicle system in which the control device is configured to:
receive control inputs from a user for activating a particular functionality, and
in response to the received user inputs, (a) activate the particular functionality and (b) simultaneously output explanation information which explains the activated functionality, and
an instruction mode of the vehicle system in which the control device is configured to:
receive control inputs from the user for selecting a desired functionality, and
in response to the received user inputs, (a) automatically initiate a change over from the instruction mode to the assistance mode, and (b) after switching to the assistance mode, output only explanation information which instructs the user to trigger and/or to operate the desired functionality and/or explains the desired functionality.

2. The vehicle system according to claim 1, wherein the control device comprises a comparison module by means of which the control inputs in an assistance mode triggered by the instruction mode are compared to the intended control inputs for at least one of triggering and operating the desired functionality, and in case of at least one of a deviation and correlation a feedback is output to the user.

3. The vehicle system according to claim 1, wherein the vehicle system is operable in an operating mode in which control inputs are only considered and evaluated as control inputs for operating the provided functionalities and no additional explanation information is output.

4. The vehicle system according to claim 1, wherein the vehicle system is operable in an explanation mode in which the control inputs are only considered and evaluated as control inputs for retrieving explanation information.

5. The vehicle system according to claim 1, wherein the vehicle system comprises a configuration unit by means of which one of the operating modes may be determined into which the vehicle system changes over following a start-up.

6. The vehicle system according to claim 1, wherein at a first-time change-over into at least one of the instruction mode following a start-up, the assistance mode, and the explanation mode automatically explanation information is output which explains the outputting of explanation information and its control by means of the control inputs.

7. The vehicle system according to claim 1, wherein the interface comprises operating elements for detecting the control inputs or is coupled to those.

8. The vehicle system according to claim 1, wherein the interface comprises at least one output device or is coupled thereto.

9. The vehicle system according to claim 1, wherein the interface is coupled to a multi-function display and operating device.

10. The vehicle system according to claim 1, wherein the vehicle system is integrated into a multi-function display and operating device.

11. The vehicle system according to claim 1, wherein the multi-function display and operating device comprises a display device comprising a programmable display surface.

12. The vehicle system according to claim 1, wherein the at least one output device comprises an audio system.

13. The vehicle system according to claim 1, wherein the outputting of the explanation information in the assistance mode comprises providing an audio explanation of the particular functionality being activated simultaneous with the activation of the particular functionality.

14. The vehicle system according to claim 1, wherein at least one of the interface and the further interface comprises several differently modal output devices or is coupled to differently modal output devices so that the explanation information may be output multimodal, or optically and acoustically.

15. The vehicle system according to claim 1, wherein the explanation information is designed to display an artificial animated person during the output of the explanation information.

16. A method for operating a vehicle system of a motor vehicle, comprising the steps:
  detecting or receiving control inputs,
  evaluating, by a control device, the control inputs and to control and provide the functionalities of the vehicle system according to the control inputs, and
  operating the vehicle system in:
  (a) an assistance mode in which:
    control inputs are received from a user for activating a particular functionality, and
    in response to the received user inputs, the particular functionality is activated and explanation information that explains the activated functionality is simultaneously output from a storage medium coupled to the control device, and
  (b) an instruction mode in which
    control inputs are received from the user for selecting a desired functionality, and
    in response to the received user inputs, a change-over from the instruction mode to the assistance mode is automatically initiated, and after switching to the assistance mode, only explanation information that instructs the user to trigger and/or to operate the desired functionality and/or explains the desired functionality is output from the storage medium.

17. The vehicle system according to claim 16, wherein in the assistance mode triggered by the instruction mode the control inputs are compared to intended control inputs for at least one of triggering and operating the desired functionality, and in the case of at least one of a deviation and a correlation a feedback is output to the user.

18. The method according to claim 16, wherein the vehicle system is operable in an operating mode in which user inputs are only considered and evaluated as control inputs and no additional explanation information is output.

19. The method according to claim 16, wherein the vehicle system is operable in an explanation mode in which the user inputs are only considered and evaluated as control inputs for retrieving explanation information.

20. The method according to claim 16, wherein at a first-time change-over into at least one of the instruction mode following a start-up, the assistance mode, and the explanation mode explanation information is output automatically which explains the outputting of explanation information and its control by means of the control inputs.

21. The method according to claim 16, wherein control inputs are detected by means of which one of the operating modes is determined into which the vehicle system changes over following a start-up.

22. The method according to claim 16, wherein the explanation information is output using an animated artificial person.

23. The method according to claim 16, wherein outputting the explanation information that explains the activated functionality simultaneous with activating the functionality in the assistance mode comprises providing an audio explanation of the functionality being activated simultaneous with the activation of the functionality.

24. The vehicle system according to claim 1, wherein in the assistance mode the control device is further configured to output further option possibilities related to the particular functionality simultaneous with the activation of the particular functionality.

* * * * *